US008229272B2

(12) United States Patent  (10) Patent No.: US 8,229,272 B2
Suh et al.  (45) Date of Patent: Jul. 24, 2012

(54) VIDEO APPARATUS CAPABLE OF CHANGING VIDEO OUTPUT MODE OF EXTERNAL VIDEO APPARATUS ACCORDING TO VIDEO INPUT MODE OF THE VIDEO APPARATUS AND CONTROL METHOD THEREOF

(75) Inventors: Jung-Soo Suh, Suwon-si (KR); Nam-hyun Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1136 days.

(21) Appl. No.: 12/102,250

(22) Filed: Apr. 14, 2008

(65) Prior Publication Data

US 2009/0046998 A1  Feb. 19, 2009

(30) Foreign Application Priority Data

Aug. 17, 2007 (KR) ........................ 10-2007-0082920

(51) Int. Cl.
*H04N 5/932* (2006.01)
*H04N 5/765* (2006.01)
*H04N 5/84* (2006.01)
*H04N 5/268* (2006.01)
*H04N 5/44* (2011.01)
*H04N 5/46* (2006.01)

(52) U.S. Cl. ........ 386/219; 386/231; 386/232; 386/334; 348/705; 348/706; 348/553; 348/555

(58) Field of Classification Search ................. 386/219, 386/231, 232, 334; 348/705, 706, 553, 555
See application file for complete search history.

(56) References Cited

U.S. PATENT DOCUMENTS

| 5,886,691 | A | * | 3/1999 | Furuya et al. ................. 715/721 |
| 6,690,425 | B1 | * | 2/2004 | Worrell ......................... 348/445 |
| 6,781,635 | B1 | * | 8/2004 | Takeda .......................... 348/552 |
| 6,798,458 | B1 | * | 9/2004 | Unemura ....................... 348/448 |
| 7,596,188 | B2 | * | 9/2009 | Gotanda et al. ............... 375/316 |
| 7,701,452 | B2 | * | 4/2010 | Fujiwara ....................... 345/204 |
| 2008/0008470 | A1 | * | 1/2008 | Lin et al. ......................... 398/66 |
| 2008/0025707 | A1 | * | 1/2008 | Sawada et al. ................ 386/126 |
| 2008/0080021 | A1 | * | 4/2008 | Ohkita ............................ 358/479 |
| 2008/0104281 | A1 | * | 5/2008 | Kim ................................. 710/2 |
| 2008/0127330 | A1 | * | 5/2008 | Seo ................................ 726/20 |
| 2008/0151113 | A1 | * | 6/2008 | Park ............................. 348/500 |
| 2008/0151118 | A1 | * | 6/2008 | Shiu et al. ..................... 348/555 |

FOREIGN PATENT DOCUMENTS

| KR | 10-2001-0045816 A | 6/2001 |
| KR | 10-2006-0063450 A | 6/2006 |

* cited by examiner

*Primary Examiner* — Hoang-Vu A Nguyen-Ba
(74) *Attorney, Agent, or Firm* — Sughrue Mion, PLLC

(57) ABSTRACT

A video apparatus capable of changing a video output mode of an external video apparatus, and a control method of the video apparatus are provided. The video apparatus includes an interface which is connected to an external video apparatus, enabling communication between the video apparatus and the external video apparatus; and a controller which generates a control message to control a video output mode of the external video apparatus and transfers the generated control message to the external video apparatus via the interface. Therefore, it is possible to prevent video and audio signals from not being output due to user inexperience, and to increase user convenience.

16 Claims, 5 Drawing Sheets

VIDEO APPARATUS CAPABLE OF CHANGING VIDEO OUTPUT MODE OF EXTERNAL VIDEO APPARATUS ACCORDING TO VIDEO INPUT MODE OF THE VIDEO APPARATUS AND CONTROL METHOD THEREOF

CROSS-REFERENCE TO RELATED APPLICATIONS

This application claims priority from Korean Patent Application No. 10-2007-0082920, filed on Aug. 17, 2007, in the Korean Intellectual Property Office, the disclosure of which is incorporated herein by reference in its entirety.

BACKGROUND OF THE INVENTION

1. Field of the Invention

Apparatuses and methods consistent with the present invention relate to controlling a video apparatus, and more particularly, to providing a user with video received from an external source or played back in a video apparatus.

2. Description of the Related Art

A variety of video apparatuses capable of recording and playing back high image quality video data and high sound quality audio data have been developed and commercially used.

Such video apparatuses comprise various types of external interfaces, which enable the video apparatuses to be connected to various electronic apparatuses to receive or transmit video and audio data.

FIG. 1 is a view showing a conventional video system. In the video system of FIG. 1, a digital television (DTV) 10 capable of outputting video is connected via a cable 20 to a digital versatile disc player (DVDP) 30 capable of playing back video recorded on the DVD.

In order to display the video played back by the DVDP 30 on the DTV 10 in the video system of FIG. 1, a video output mode of the DVDP 30 and a video input mode of the DTV 10 need to be set to be compatible with the cable 20 through which the DTV 10 is connected to the DVDP 30.

However, if the DTV 10 is connected to the DVDP 30 via other types of terminals which are not compatible, the video output mode or the video input mode may be set again to be compatible with the other types of terminals.

Accordingly, a user who is not aware of this situation may suspect that the video apparatuses have broken down, because the video is not displayed on the DTV 10 even when the video apparatuses are connected. Even when a user knows about the compatibility issue, the user needs to enter a menu of an external video apparatus and change the output mode for the video to be displayed on the DTV 10, which causes inconvenience to the user.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a video apparatus having a function of changing a video output mode of an external video apparatus, which enables the video output mode of the external video apparatus to be automatically changed by communication between the video apparatus and the external video apparatus, which are connected to each other, so that video may be provided normally to a user in order to increase user convenience, and a control method of the video apparatus.

According to an aspect of the present invention, there is provided a video apparatus comprising an interface which is connected to an external video apparatus, enabling communication between the video apparatus and the external video apparatus; and a controller which generates a control message to control a video output mode of the external video apparatus and transfers the generated control message to the external video apparatus via the interface.

The interface may receive a video signal transmitted from the external video apparatus.

The interface may be connected to the external video apparatus to communicate between the video apparatus and the external video apparatus according to a high-definition multimedia interface (HDMI)-consumer electronics control (CEC) standard.

The controller may receive information regarding the video output mode of the external video apparatus via the interface, in response to an information request that has been transmitted to the external video apparatus via the interface.

The controller may generate the control message based on the information regarding the video output mode of the external video apparatus which is received via the interface.

If it is determined that the video output mode of the external video apparatus determined using the information regarding the video output mode of the external video apparatus differs from the type of connection between the video apparatus and the external video apparatus, the controller may generate a control message containing a request to change the video output mode of the external video apparatus to the type of connection between the video apparatus and the external video apparatus.

The controller may transfer the control message to the external video apparatus via the interface in a half-duplex manner.

According to another aspect of the present invention, there is provided a method for controlling an external video apparatus, the method comprising generating a control message to control a video output mode of the external video apparatus connected to a video apparatus; and transferring the generated control message to the external video apparatus.

The transferring may comprise transferring the control message to the external video apparatus according to a high-definition multimedia interface (HDMI)-consumer electronics control (CEC) standard.

The method may further comprise receiving information regarding the video output mode of the external video apparatus, in response to an information request that has been transmitted to the external video apparatus.

The generating may comprise generating the control message based on the information regarding the video output mode of the external video apparatus.

If it is determined that the video output mode of the external video apparatus determined using the information regarding the video output mode of the external video apparatus differs from the type of connection between the video apparatus and the external video apparatus, the generating may comprise generating a control message containing a request to change the video output mode of the external video apparatus to the type of connection between the video apparatus and the external video apparatus.

The transferring may comprise transferring the control message to the external video apparatus in a half-duplex manner.

According to another aspect of the present invention, there is provided an external video apparatus comprising an interface which is connected to a video apparatus, enabling communication between the video apparatus and the external video apparatus; and a controller which changes a video output mode according to information regarding the video output mode which is contained in a control message received from the video apparatus.

According to another aspect of the present invention, there is provided a method for controlling an external video apparatus, the method comprising receiving a control message from a video apparatus; and changing a video output mode according to information regarding the video output mode which is contained in the received control message.

BRIEF DESCRIPTION OF THE DRAWINGS

The above aspects and other aspects of the present invention will become apparent and more readily appreciated from the following description of the exemplary embodiments, taken in conjunction with the accompanying drawings, in which.

DETAILED DESCRIPTION OF EXEMPLARY EMBODIMENTS

Figure 1:
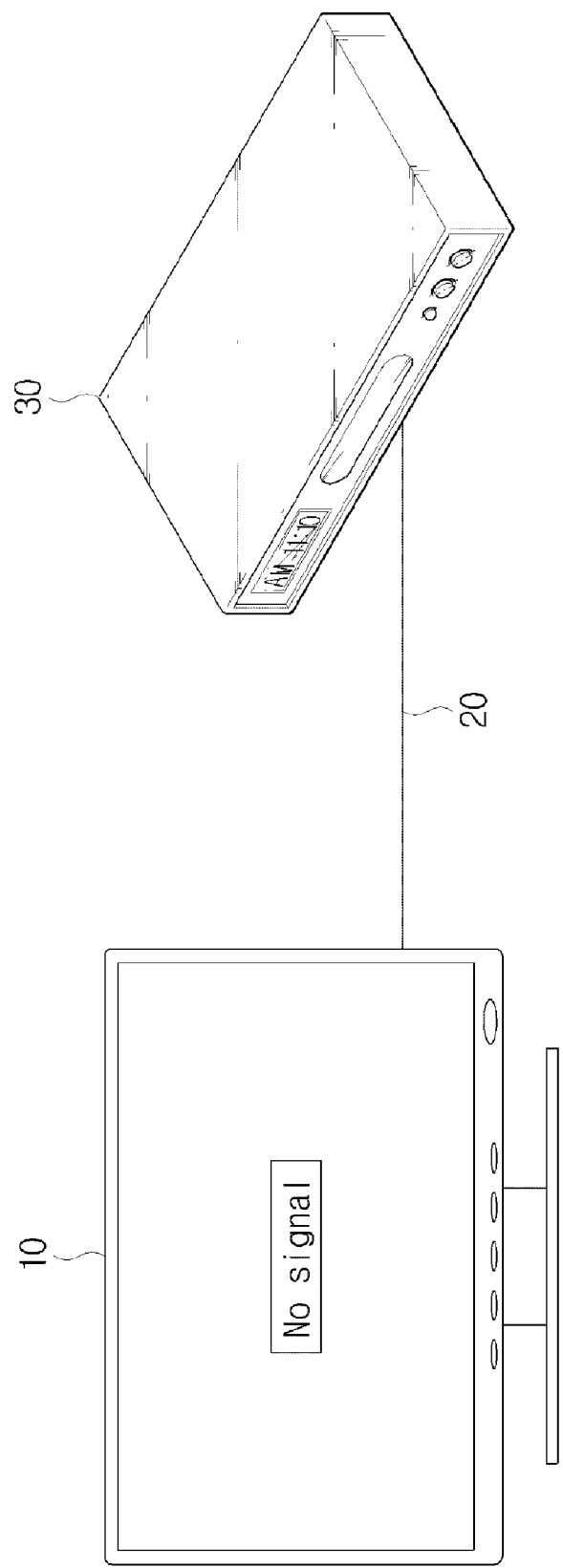
FIG. 1 is a view showing a conventional video system.

Certain exemplary embodiments of the present invention will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the exemplary embodiments of the present invention can be carried out without those specifically defined matters. Also, well-known functions or constructions are not described in detail since they would obscure the invention with unnecessary detail.

Figure 2:
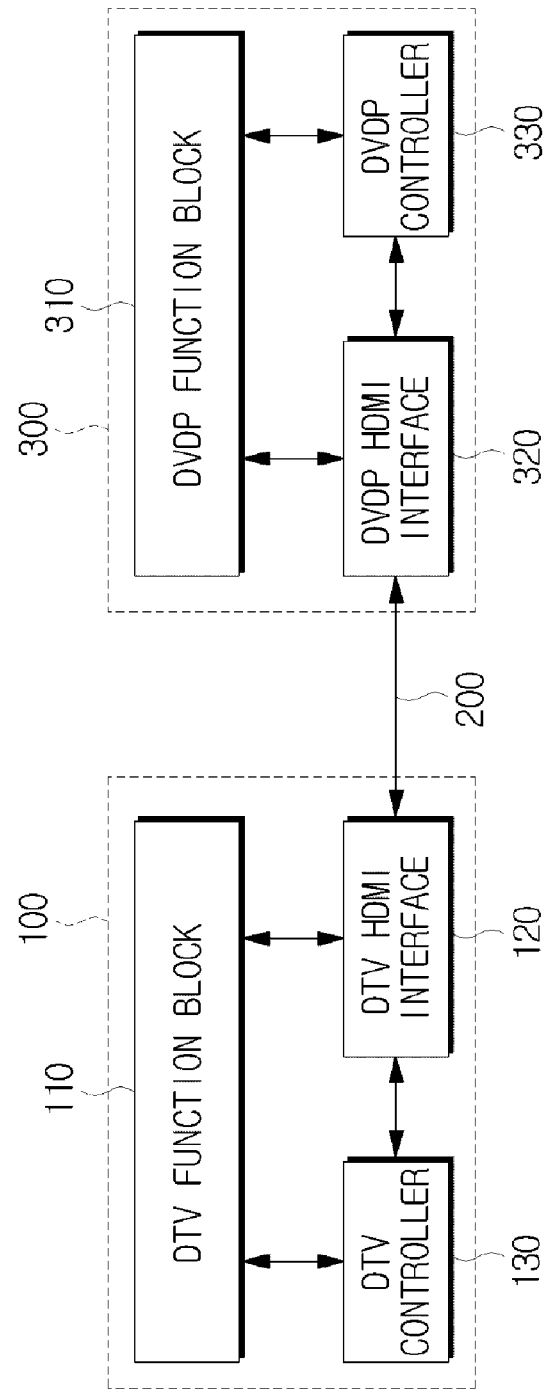
FIG. 2 is a block diagram showing an example of a video system to which the present invention is applicable.

FIG. 2 is a block diagram showing an example of a video system to which the present invention is applicable.

The video system of FIG. 2 is configured by connecting a digital television (DTV) 100 and a digital versatile disc player (DVDP) 300 via a high-definition multimedia interface (HDMI) cable 200 complying with the HDMI standard.

The DTV 100 comprises a DTV function block 110, a DTV HDMI interface 120 and a DTV controller 130.

The DTV function block 110 performs general functions of a DTV. Specifically, the DTV function block 110 performs signal processing, such as decoding or scaling, with respect to a broadcast signal received wiredly or wirelessly from a broadcasting station, and displays the processed broadcast signal on a display (not shown), so that a user may be provided with a broadcast screen. The DTV function block 110 may display video corresponding to a video signal transferred from the DVDP 300 through the DTV HDMI interface 120 on the display.

The DTV HDMI interface 120 connects the DTV 100 to the DVDP 300 according to the HDMI-consumer electronics control (CEC) standard, so that video signals and control messages may be transceived between the DTV 100 and the DVDP 300.

The DTV controller 130 controls the operations of the DTV function block 110 according to user commands. The DTV controller 130 transmits a control message to the DVDP 300 through the DTV HDMI interface 120, to also control the operation of the DVDP 300.

Specifically, the DTV controller 130 generates a control message conforming to the HDMI-CEC standard, and transmits the generated control message. In this situation, the HDMI-CEC message may be transmitted in a half-duplex manner via a line different from a line through which video signals are transmitted.

The HDMI cable 200 comprises a line for transmitting video and audio signals according to the HDMI standard and a line for transmitting control messages.

As shown in FIG. 2, the DVDP 300 comprises a DVDP function block 310, a DVDP HDMI interface 320 and a DVDP controller 330.

The DVDP function block 310 performs general functions of a DVDP. Specifically, the DVDP function block 310 reads a video signal recorded on a built-in DVD, and provides the read video signal to the DTV 100 through the DVDP HDMI interface 320.

The DVDP HDMI interface 320 is connected to the DTV 100 according to the HDMI standard, so that video signals and control messages may be transceived between the DTV 100 and the DVDP 300.

The DVDP controller 330 controls all operations of the DVDP 300. The DVDP controller 330 also controls the operations of the DVDP function block 310 in response to the control message transferred from the DTV controller 130 via the DVDP HDMI interface 320.

In the video system configured as described above, if it is determined that a video signal output from the DVDP 300 is not output to the HDMI cable 200, the DTV 100 may generate a control message to control a video output mode of the DVDP 300, and transfer the generated control message to the DVDP 300 through the HDMI cable 200, so that the video output mode of the DVDP 300 may change to a mode identical to a video input mode of the DTV 100.

In other words, the video output mode of the DVDP 300 may be converted to a mode identical to the type of connection between the DVDP 300 and the DTV 100, using the control message to control the video output mode of the DVDP 300. In this exemplary embodiment, the HDMI cable may be used as a connection type, but other types of connection may be used.

Figure 3:
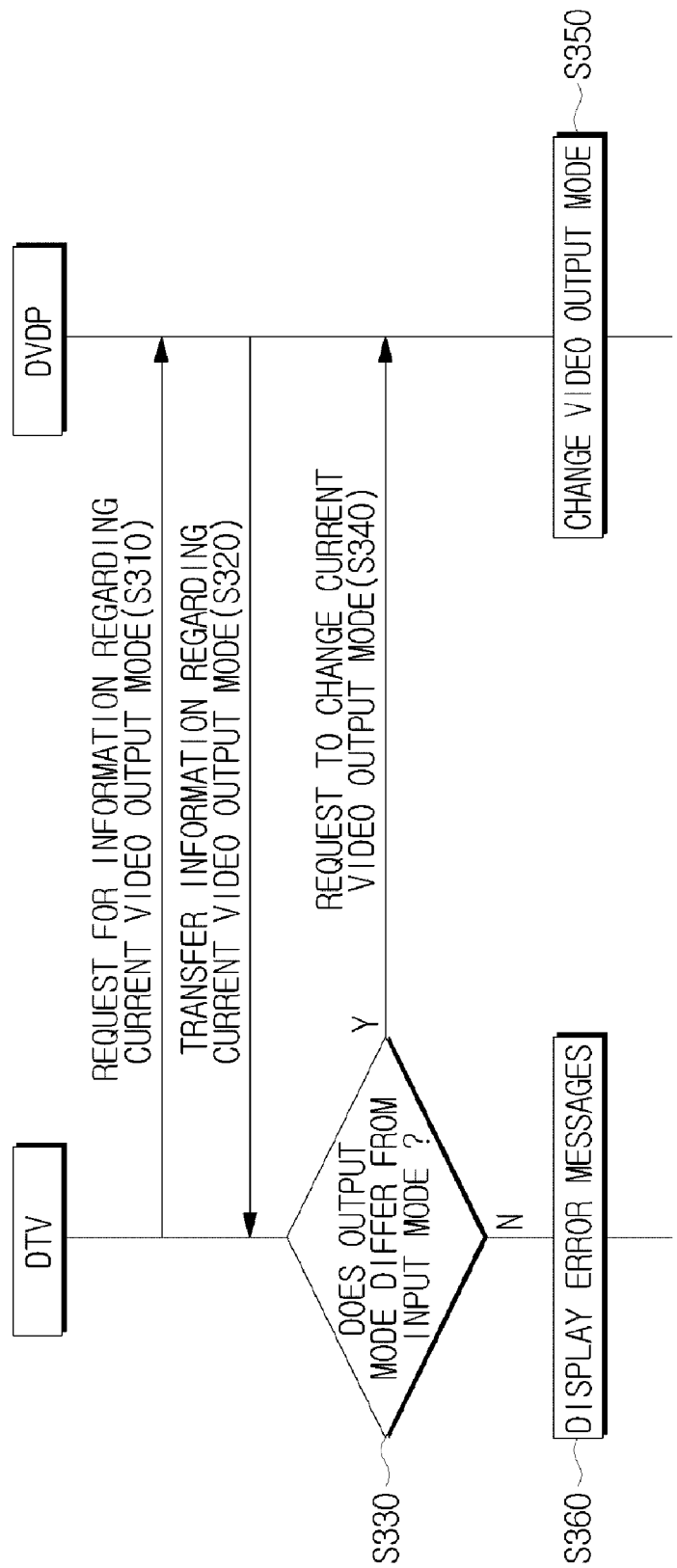
FIG. 3 is a diagram explaining a method for changing a video output mode of an external video apparatus, according to an exemplary embodiment of the present invention.

Hereinafter, a process of controlling the video output mode of the DVDP 300 in the DTV 100 will be described in detail with reference to FIG. 3. FIG. 3 is a diagram explaining a method for changing a video output mode of an external video apparatus, according to an exemplary embodiment of the present invention.

In FIG. 3, if it is determined that the video signal output from the DVDP 300 is not output to the HDMI cable 200, the DTV controller 130 of the DTV 100 may generate a control message containing a request for information regarding the video output mode of the DVDP 300 and may transfer the generated control message to the DTV HDMI interface 120, so that the control message may be transmitted to the DVDP 300 through the HDMI cable 200 (S310).

Subsequently, the DVDP controller 330 of the DVDP 300 may check a current video output mode of the DVDP 300. The DVDP controller 330 may then generate a control message containing the information regarding the video output mode of the DVDP 300 and may transfer the generated control message to the DVDP HDMI interface 320, so that the control message may be transmitted to the DTV 100 through the HDMI cable 200 (S320).

The DTV 100 may then determine, using the received control message containing the information regarding the video output mode of the DVDP 300, whether the current video output mode of the DVDP 300 differs from the video input mode of the DTV 100 (S330).

In more detail, the DTV 100 may compare the video output mode of the DVDP 300 to the video input mode of the DTV 100, which is the HDMI mode, in order to check whether other output interfaces are used to output video from the DVDP 300 instead of the DVDP HDMI interface 320, even when the DTV HDMI interface 120 of the DTV 100 is connected to the DVDP HDMI interface 320 of the DVDP 300.

If it is determined that the video output mode of the DVDP 300 differs from the video input mode of the DTV 100, which is the HDMI mode, the DTV controller 130 of the DTV 100 may generate a control message containing a request to change the video output mode of the DVDP 300 to a mode identical to the video input mode of the DTV 100, and may transfer the generated control message to the DTV HDMI interface 120, so that the control message may be transmitted to the DVDP 300 via the HDMI cable 200 (S340).

The DVDP controller 330 of the DVDP 300 may then control the DVDP function block 310 to change the video output mode of the DVDP 300 to the video input mode of the DTV 100, namely the HDMI mode, in response to the received control message, so that the current video output mode may be identical to the HDMI mode (S350).

If it is determined that the video output mode of the DVDP 300 is identical to the video input mode of the DTV 100, the DTV controller 130 of the DTV 100 may control the DTV function block 110, which comprises a display (not shown) on which predetermined information is displayed, so that error messages related to the DTV 100 or the HDMI cable 200 or the DVDP 300 may be displayed (S360).

Hereinafter, another process of controlling the video output mode of the DVDP 300 in the DTV 100 will be described in detail with reference to FIG. 4.

Figure 4:
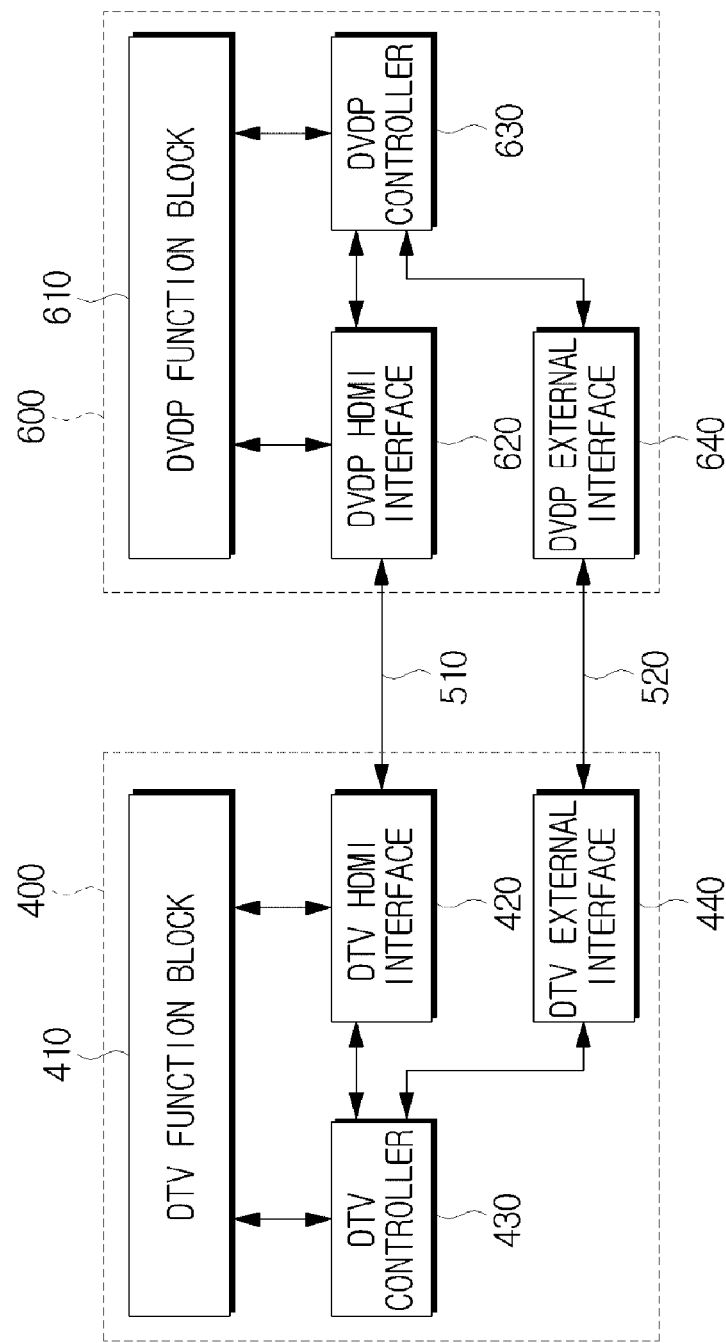
FIG. 4 is a block diagram showing another example of a video system to which the present invention is applicable.

FIG. 4 is a block diagram showing another example of a video system to which the present invention is applicable.

The video system of FIG. 4 is configured by connecting a DTV 400 and a DVDP 600 via an HDMI cable 510, capable of transferring video and audio signals, complying with the HDMI standard and via a control cable 520 capable of transferring control messages.

The DTV 400 of the video system shown in FIG. 4 comprises a DTV function block 410, a DTV HDMI interface 420 and a DTV controller 430, which function respectively the same as the DTV function block 110, DTV HDMI interface 120 and DTV controller 130 of the DTV 100 shown in FIG. 2. The DTV 400 further comprises a DTV external interface 440, which is capable of transmitting a control message generated by the DTV controller 430 to the DVDP 600 or capable of receiving a control message transmitted from the DVDP 600.

The DVDP 600 of the video system shown in FIG. 4 comprises a DVDP function block 610, a DVDP HDMI interface 620 and a DVDP controller 630, which function respectively the same as the DVDP function block 310, DVDP HDMI interface 320 and DVDP controller 330 of the DVDP 300 shown in FIG. 2. The DVDP 600 of FIG. 4 further comprises a DVDP external interface 640, which is capable of transmitting a control message generated by the DVDP controller 630 to the DTV 400 or capable of receiving a control message transmitted from the DTV 400.

The DTV external interface 440 and DVDP external interface 640 are connected via the control cable 520, which may transmit control messages and which is distinct from the HDMI cable 510.

If it is determined that a video signal output from the DVDP 600 is not output to the HDMI cable 510, the DTV 400 may generate a control message to control a video output mode of the DVDP 600, and transfer the generated control message to the DVDP 600 through the control cable 520, so that the video output mode of the DVDP 600 may change to a mode identical to the video input mode of the DTV 400 (that is, the type of connection between the DTV 400 and the DVDP 600).

Hereinafter, another process of controlling the video output mode of the DVDP 600 in the DTV 400 will be described in detail with reference to FIG. 5.

Figure 5:
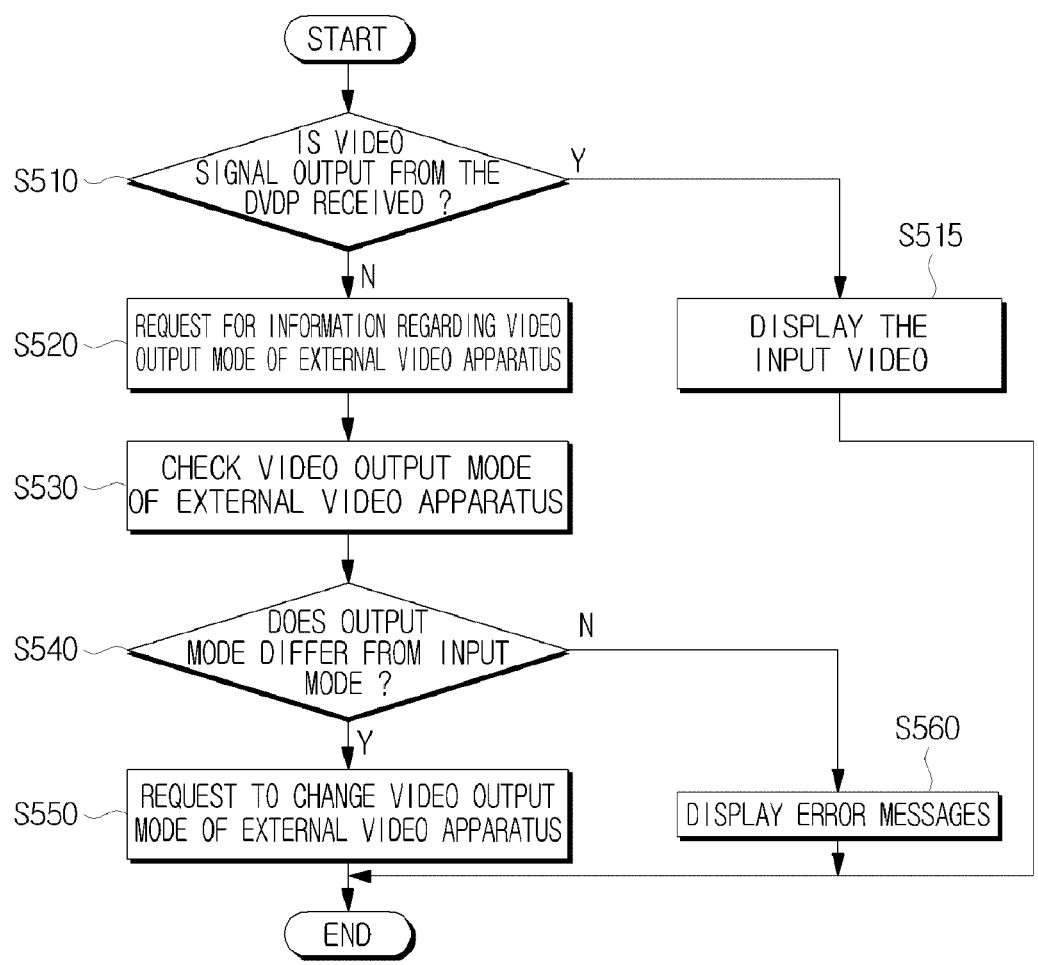
FIG. 5 is a flowchart explaining a method for changing a video output mode of an external video apparatus, according to another exemplary embodiment of the present invention.

FIG. 5 is a flowchart explaining a method for changing a video output mode of an external video apparatus, according to another exemplary embodiment of the present invention.

In FIG. 5, the DTV controller 430 may determine whether the video signal output from the DVDP 600 is received via the DTV HDMI interface 420 (S510). If it is determined that the video signal output from the DVDP 600 is received via the DTV HDMI interface 420 (S510-Y), the DTV controller 430 may control the DTV function block 410 to display the received video signal (S515).

If it is determined that the video signal output from the DVDP 600 is not received via the DTV HDMI interface 420 (S510-N), the DTV controller 430 may generate a control message containing a request for information regarding the video output mode of the DVDP 600 and may transfer the generated control message to the DTV external interface 440, so that the control message may be transmitted to the DVDP 600 via the control cable 520 (S520).

The DTV controller 430 may then check a current video output mode of the DVDP 600 using a control message containing the information regarding the video output mode of the DVDP 600, which is received from the DVDP 600 via the DTV external interface 440 (S530).

Subsequently, the DTV controller 430 may determine whether the current video output mode of the DVDP 600 differs from the video input mode of the DTV 400 (S540).

If it is determined that the video output mode of the DVDP 600 differs from the video input mode of the DTV 400 (S540-Y), the DTV controller 430 may generate a control message containing a request to change the video output mode of the DVDP 600 to a mode identical to the video input mode of the DTV 400, and may transfer the generated control message to the DTV external interface 440, so that the control message may be transmitted to the DVDP 600 via the control cable 520 (S550).

If it is determined that the video output mode of the DVDP 600 is identical to the video input mode of the DTV 400 (S540-N), the DTV controller 430 may control the DTV function block 410 comprising a display (not shown) on which predetermined information is displayed, so that error messages related to the DTV 400 or the HDMI cable 510 or the DVDP 600 may be displayed (S560).

Although the HDMI-CEC standard is provided in this exemplary embodiment of the present invention, any connection interface capable of transceiving video signals and control messages may also be used.

Additionally, two cables, that is, the HDMI cable 510 and control cable 520 are provided to separately transfer control messages and video signals in this exemplary embodiment of the present invention, but the present invention may be applied to any interface capable of transceiving both video signals and control messages.

As described above, according to exemplary embodiments of the present invention, a video output mode of an external video apparatus connected to a video apparatus may automatically change according to the video input mode of the video apparatus, so it is possible to prevent video and audio signals from not being output due to user inexperience, and so it is possible to increase user convenience.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A video apparatus comprising:
   an interface which is connected to an external video apparatus, enabling communication between the video apparatus and the external video apparatus; and
   a controller which compares a video output mode of the external video apparatus to a video input mode of the video apparatus, generates a control message to control the video output mode of the external video apparatus and transfers the generated control message to the external video apparatus via the interface.

2. The video apparatus as claimed in claim 1, wherein the interface receives a video signal transmitted from the external video apparatus.

3. The video apparatus as claimed in claim 2, wherein the interface is connected to the external video apparatus to communicate between the video apparatus and the external video apparatus according to a high-definition multimedia interface (HDMI)-consumer electronics control (CEC) standard.

4. The video apparatus as claimed in claim 2, wherein the interface uses a different cable to receive the video signal transmitted from the external video apparatus from a cable to transfer the generated control message to the external video apparatus.

5. The video apparatus as claimed in claim 1, wherein the controller receives information regarding the video output mode of the external video apparatus via the interface, in response to an information request that has been transmitted to the external video apparatus via the interface.

6. The video apparatus as claimed in claim 5, wherein the controller generates the control message based on the information regarding the video output mode of the external video apparatus which is received via the interface.

7. The video apparatus as claimed in claim 6, wherein the controller generates the control message containing a request to change the video output mode of the external video apparatus to the type of connection between the video apparatus and the external video apparatus, if it is determined that the video output mode of the external video apparatus determined using the information regarding the video output mode of the external video apparatus differs from the type of connection between the video apparatus and the external video apparatus.

8. The video apparatus as claimed in claim 1, wherein the controller transfers the control message to the external video apparatus via the interface in a half-duplex manner.

9. A method for controlling an external video apparatus, the method comprising:
   comparing a video output mode of the external video apparatus to a video input mode of a video apparatus;
   generating a control message to control the video output mode of the external video apparatus connected to the video apparatus; and
   transferring the generated control message to the external video apparatus.

10. The method as claimed in claim 9, wherein the transferring comprises transferring the control message to the external video apparatus according to a high-definition multimedia interface (HDMI)-consumer electronics control (CEC) standard.

11. The method as claimed in claim 9, further comprising receiving information regarding the video output mode of the external video apparatus, in response to an information request that has been transmitted to the external video apparatus.

12. The method as claimed in claim 11, wherein the generating comprises generating the control message based on the information regarding the video output mode of the external video apparatus.

13. The method as claimed in claim 12, wherein the generating comprises generating the control message containing a request to change the video output mode of the external video apparatus to the type of connection between the video apparatus and the external video apparatus, if it is determined that the video output mode of the external video apparatus determined using the information regarding the video output mode of the external video apparatus differs from the type of connection between the video apparatus and the external video apparatus.

14. The method as claimed in claim 9, wherein the transferring comprises transferring the control message to the external video apparatus in a half-duplex manner.

15. An external video apparatus comprising:
   an interface which is connected to a video apparatus, enabling communication between the video apparatus and the external video apparatus; and
   a controller which changes a video output mode to a mode identical to a video input mode of the video apparatus according to information regarding the video output mode which is contained in a control message received from the video apparatus.

16. A method for controlling an external video apparatus, the method comprising:
   receiving a control message from a video apparatus; and
   changing a video output mode to a mode identical to a video input mode of the video apparatus according to information regarding the video output mode which is contained in the received control message.

* * * * *